March 23, 1965 A. W. PECK 3,174,634
TELESCOPIC MULTI-PURPOSE LIFTING UNIT
Filed Feb. 8, 1962 7 Sheets-Sheet 1
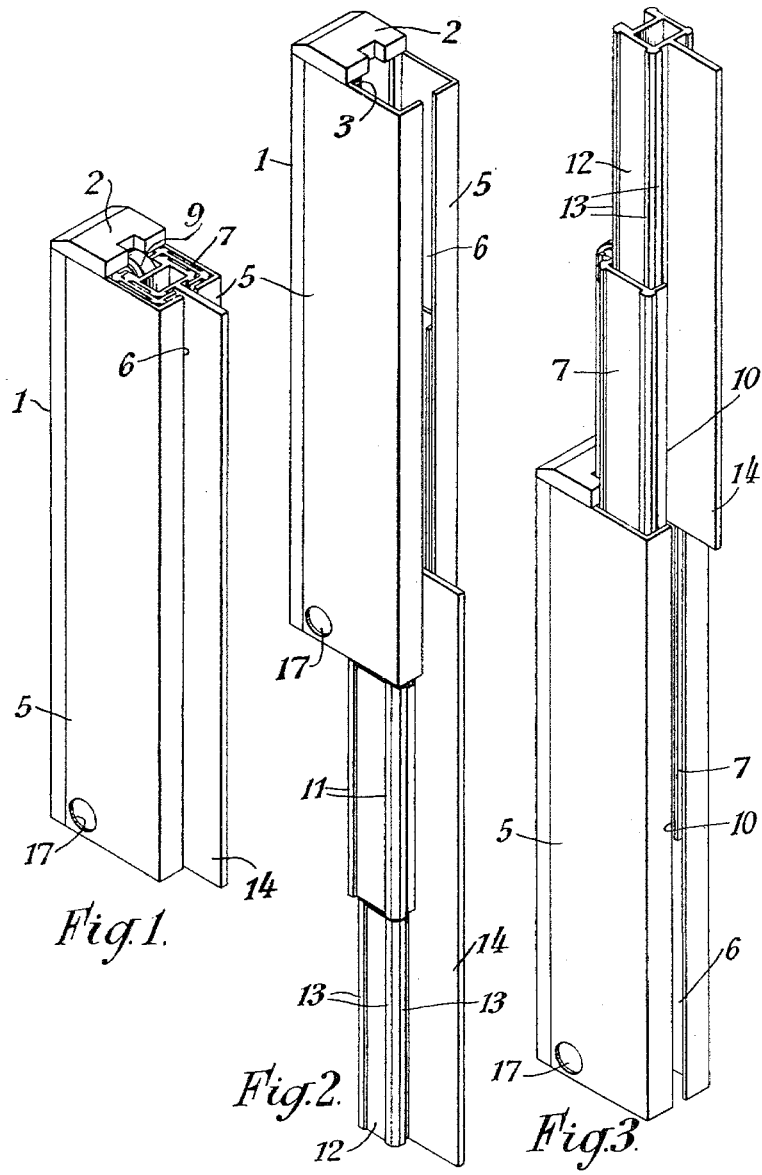
INVENTOR
ALBERT W. PECK
BY
Shoemaker and Mattare
ATTORNEYS

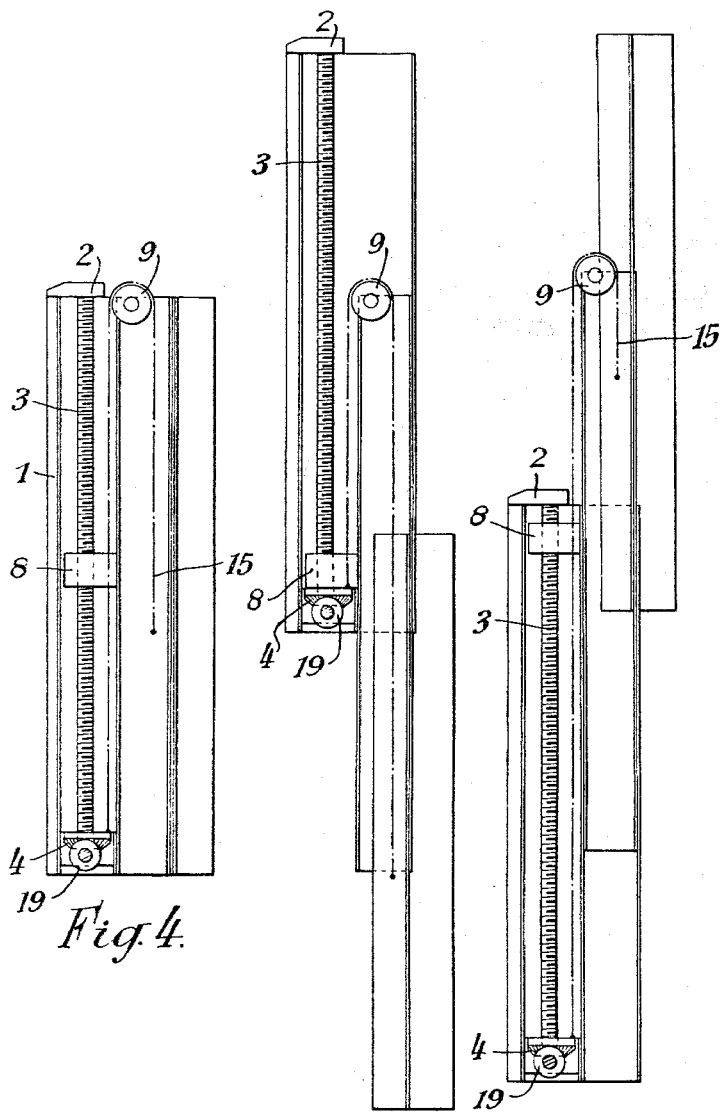

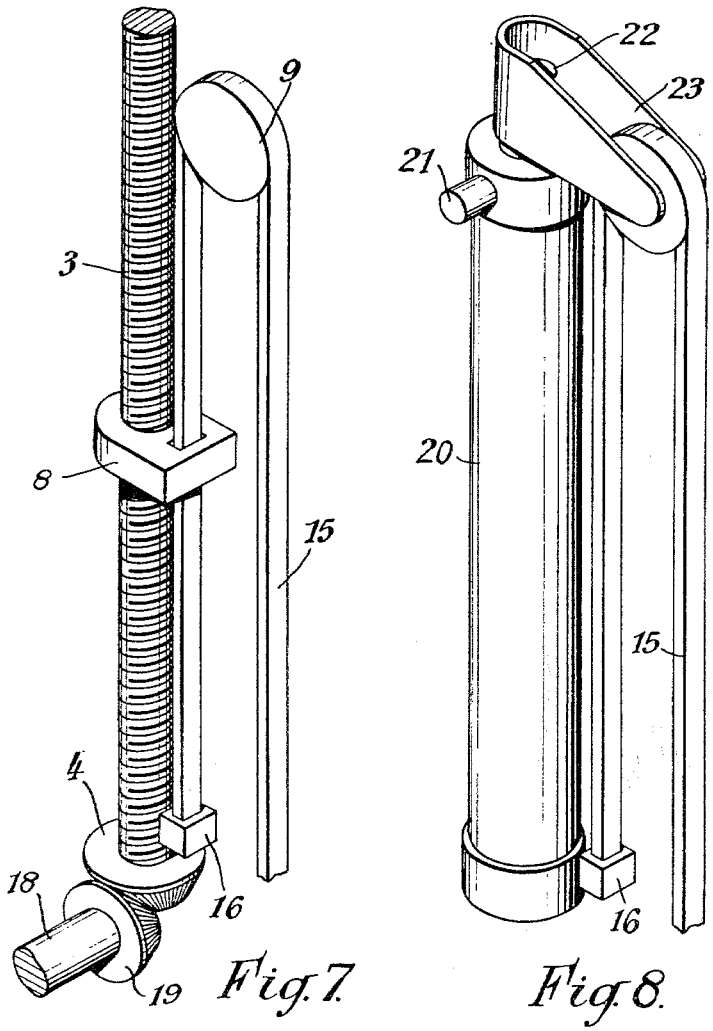

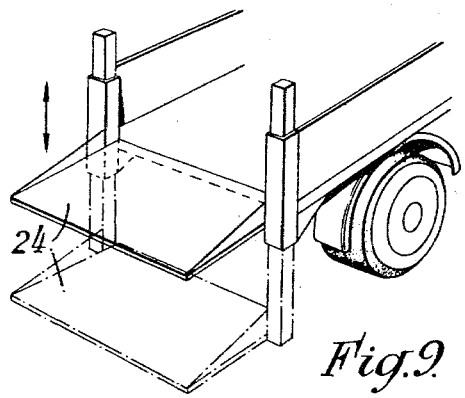
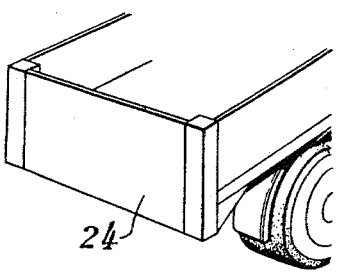
Fig. 9.  Fig. 10.
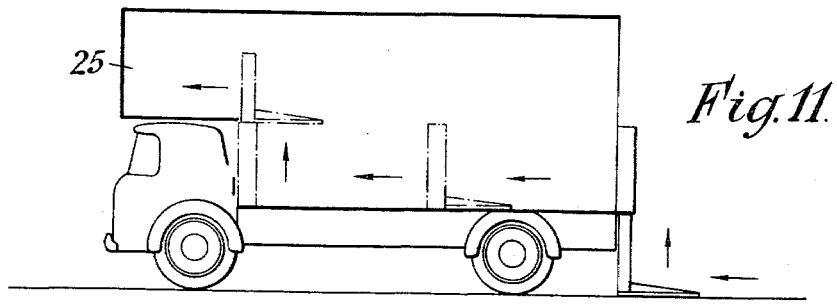
Fig. 11.
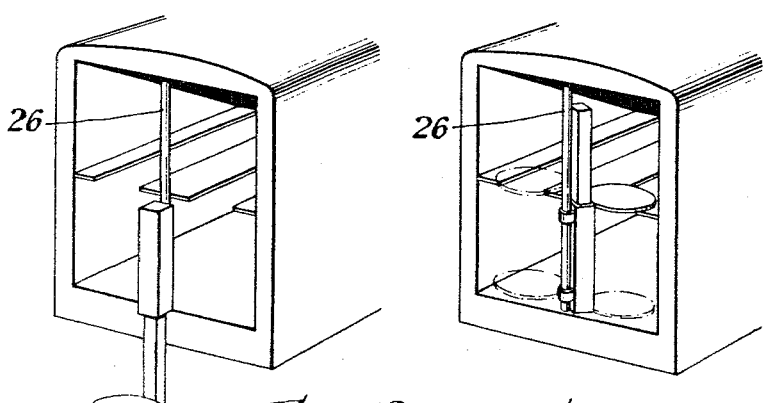
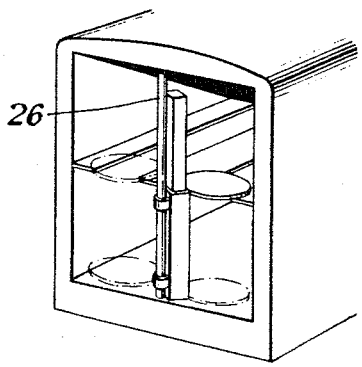
Fig. 12.  Fig. 13.
INVENTOR
ALBERT W. PECK
BY
ATTORNEYS March 23, 1965   A. W. PECK   3,174,634
TELESCOPIC MULTI-PURPOSE LIFTING UNIT
Filed Feb. 8, 1962   7 Sheets-Sheet 5
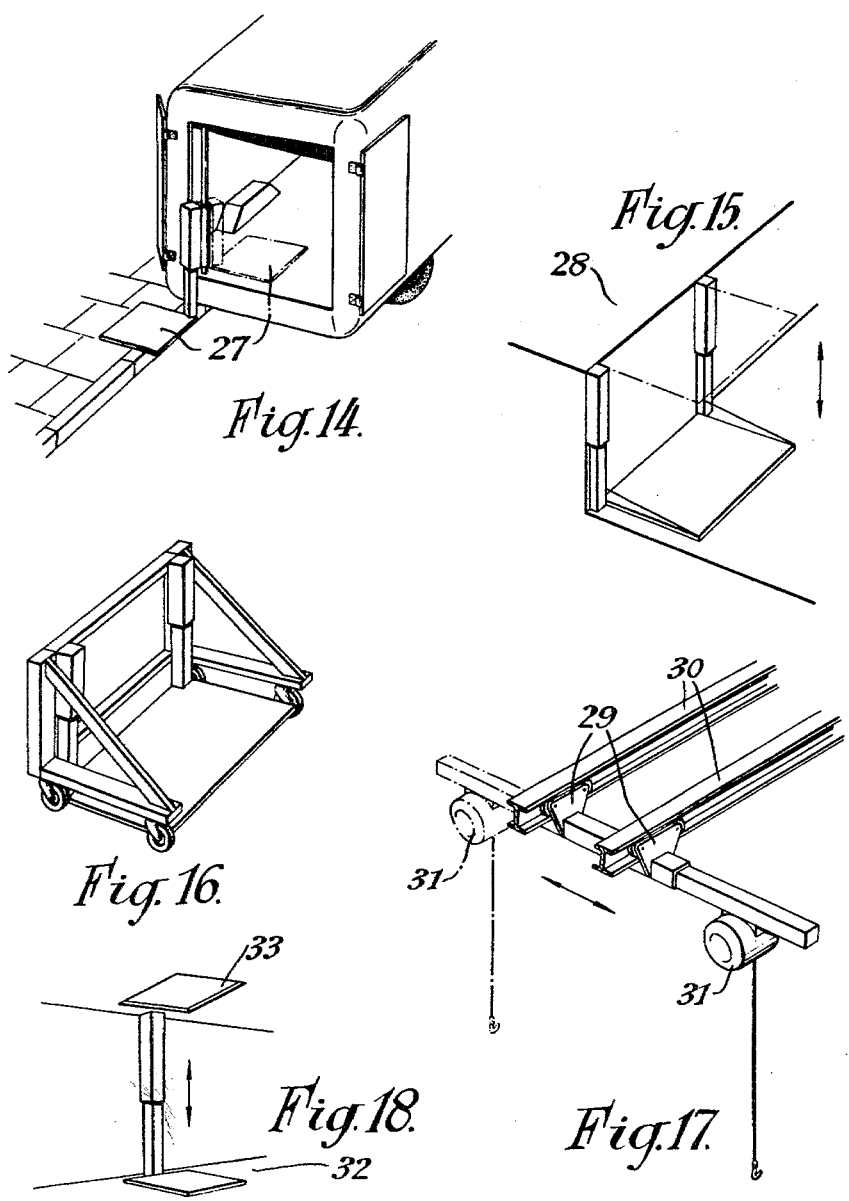
INVENTOR
ALBERT W. PECK
BY
Shoemaker and Mattare
ATTORNEYS

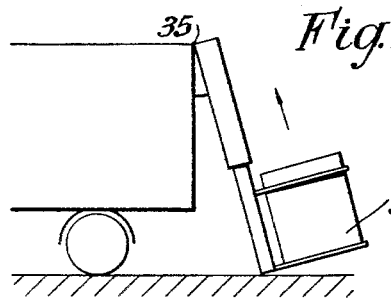
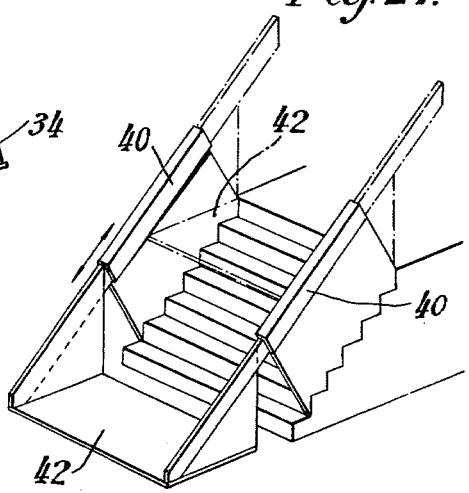
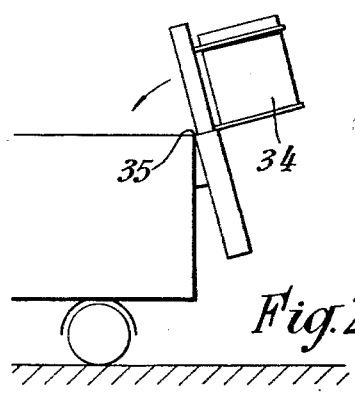
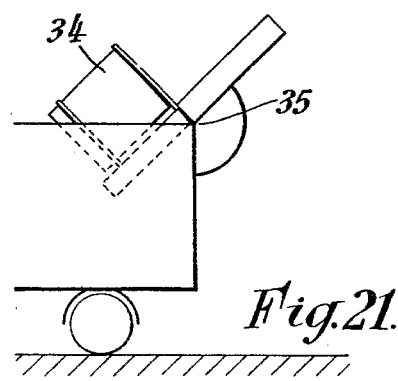
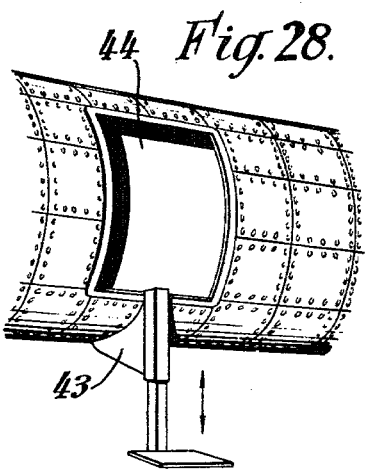
INVENTOR
ALBERT W. PECK
BY
Shoemaker and Mattare
ATTORNEYS March 23, 1965  A. W. PECK  3,174,634
TELESCOPIC MULTI-PURPOSE LIFTING UNIT
Filed Feb. 8, 1962  7 Sheets-Sheet 7

INVENTOR
ALBERT W. PECK
BY
Shoemaker and Mattare
ATTORNEYS

United States Patent Office 3,174,634
Patented Mar. 23, 1965

3,174,634
TELESCOPIC MULTI-PURPOSE LIFTING UNIT
Albert William Peck, Welwyn Garden City, England, assignor to U.S. Industries Inc. Engineering Limited
Filed Feb. 8, 1962, Ser. No. 171,937
Claims priority, application Great Britain, Feb. 8, 1961, 4,636/61
8 Claims. (Cl. 214—75)

This invention relates to a multi-purpose lifting unit for the lifting and lowering of loads, and has for its main object to provide a compact, easily-operated, self-contained unit which can be adapted to a wide variety of situations where the lifting and lowering of loads is required, the unit being adaptable both to a direct vertical lift and to a lift in an inclined direction, as the particular occasion may demand. Some examples of the use of the devices are instanced below.

Among the more important uses of the invention is its adaptation to the lifting and lowering of the tailboard or loading platform of a vehicle so as to bring a load from street level up to the level of the vehicle deck and vice-versa. Other similar uses would be in the transferring of loads from one level to another within a vehicle itself, in lifting and lowering loads at a vehicle-loading and unloading dock or bay in a factory, in a mobile lifter trolley or truck, and so on. In some other uses of the invention it may be arranged for the horizontal transfer of a load, as distinct from a vertical lift, for example by propelling a cable hoist or other lifting tackle along an overhead runway.

In its application to lifting and lowering tailboards for vehicles the invention offers particular advantages. Hitherto these devices have had to be "Tailor-made," that is to say have required individual fitting to the vehicles concerned, in view of a wide variety of sizes and shapes of vehicle and vehicle body. This requirement has arisen partly from the fact that in the known devices the moving parts were not adapted to resist a canti-lever torque in all directions, and also from the fact that only one driving means has been provided for both off-side and near-side lifters.

In contradistinction to the known art the present invention provides an elementary unit which can be applied as a pre-assembled structure either singly or in pairs (or other plurality) according to the type of structure in question and without calling for special variation of the unit to adapt it to the shape and size of said structure, and which will carry a load canti-lever wise from all aspects.

In its broadest aspect the invention provides a self-contained lifting and lowering unit comprising a telescopic assembly of members, said members having longitudinally extended mutual contact and being capable of telescopic action at both ends of the assembly, and thrust means within the assembly adapted to effect relative telescopic movement between all said members simultaneously in predetermined velocity ratios.

A preferred embodiment of lifting unit according to this invention comprises, as a self-contained assembly telescopic at both ends, an outer casing adapted for attachment to a fixed (or movable) structure, an inner element adapted for attachment to a movable (or fixed) structure and at least one intermediate element between said casing and inner element, all said elements having longitudinally disposed guide faces to bear against the next adjacent element, a flexible means connecting said outer and inner parts together, said flexible means being folded over a guide on the or each intermediate member, and a thrust mechanism in said casing operable to move said inner and intermediate elements telescopically to any position between a maximum extension at one end of the assembly and a maximum extension at the other end of the assembly. The said thrust mechanism for effecting the telescoping movement may be for example a hydraulic or pneumatic motor, or may be a screw and nut mechanism, or otherwise as desired. In the former cases it may be of piston and cylinder type or it may be an inflatable/deflatable bag. In any event, the thrust mechanism of a unit may be adapted for coupling to the corresponding mechanism of one or more other units so that all those units may operate in synchronism, say by receiving pressure fluid from a common source if of a fluid-operated type or by having their screws (or nuts) rotated by a common power unit if of a screw and nut type.

According to a further feature of the invention the said casing of the unit comprises a backing plate for direct attachment to a vehicle body or other fixed structure, and providing a support for the thrust mechanism, and front plates enclosing the intermediate and inner members and providing guideways for the same. Each intermediate member is shaped externally to form guides to co-operate with like formations on the next outer and next inner member, and the innermost member is adapted for attachment to the load-carrying apparatus to be lifted and lowered. In order to allow for the double-ended telescoping action all the intermediate members and the said casing are slotted longitudinally to allow the attachment to the load-carrying apparatus to travel its full distance.

The lifting thrust is applied to a chain, belt, cable or the like, one end of which is attached to the casing at or near its lower end and the other end of which is attached to the innermost slider at a suitable point, and such chain, cable or the like passes over a guide pulley or sprocket at the top end of the intermediate member. The thrust mechanism acts primarily on the intermediate member the movements of which displace said guide pulley or sprocket. Accordingly, as the intermediate member is displaced by the thrust mechanism it also displaces the inner member through twice the distance by reason of the straightening out of the chain or cable. Limit stops are provided to limit the up and down movement of the primary slider. In the case of a fluid-operated device acting vertically, the return movement may be effected by gravity and/or in all other cases, the thrust mechanism may be double-acting. In some cases trip means may be provided to allow of a rapid return movement.

One convenient form of thrust mechanism is a rotatable screw provided in the said casing, driven say through bevel gears at the bottom of the casing, and carrying a nut which is attached to the intermediate member. In another form, a hydraulic thrust cylinder is mounted in the casing, and the ram thereof is attached to a primary slider.

Representative embodiments of the invention will now be described with reference to the accompanying drawings, wherein:

FIG. 1 is a perspective view of one embodiment, the parts being in the collapsed or neutral position;

FIG. 2 is a view similar to FIG. 1, showing the parts extended downwardly; whilst FIG. 3 is a similar view showing the parts extended upwardly;

FIGS. 4, 5 and 6 are diagrammatic sectional side views to a smaller scale, showing the three positions of the parts as in FIGS. 1, 2 and 3 respectively;

FIG. 7 is a perspective view of a screw-and-nut type of thrust member for use in the device shown in FIGS. 1–6; and FIG. 8 is a similar view of a hydraulic or pneumatic type of thrust member for the same purpose;

FIGS. 9–28 are diagrammatic views, mostly in perspective, illustrating various adaptations and modifications of the invention.

Figure 22:
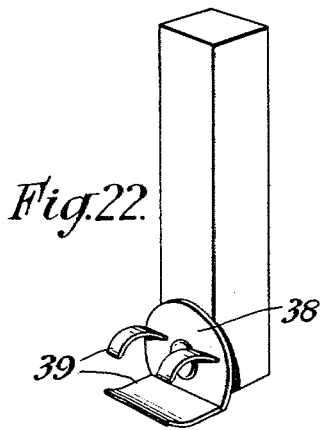

Referring first to FIGS. 1–7, there is a vertical backing plate 1 provided with a bearing block 2 at the top and bottom to receive the upper and lower ends of a rotatable screw 3. The lower end of the screw carries a bevel gear 4. Attached to such backing plate are the sides 5 of a casing, so shaped as to leave a vertical opening 6 between them at the front. In such casing is slidably guided a substantially square-sectioned intermediate member 7 of approximately the same length as the said casing and having connected to its rear face a nut 8 which embraces the said screw 3. The height of this nut 8 on said intermediate member 7 may be variable and is determined by the intended lowermost position of the inner member with respect to the casing. For use with a vehicle platform, the said nut will be substantial at mid-height position on the intermediate member as shown in the drawings.

And its rear top corner such intermediate member 7 carries a pulley 9 freely-rotatable on a longitudinal axis. The front wall of this intermediate member 7 has a vertical opening 10 in register with the said vertical opening 6 in the outer casing.

The intermediate member 7 is formed with raised faces 11 on each side (machined or ground if necessary), near the vertical corners, to provide extended slides to fit against the inner walls of the outer casing. Also, such member 7 is itself shaped and machined interiorly to form guideways for the inner slidable member 12 having similar raised faces 13, and this last member 12 has a vertical web 14 extending out through the vertical openings 10 and 6 in the intermediate member 7 and outer casing, for attachment to the part which is to be moved, e.g. a platform for the goods to be lifted and lowered. The web 14 may be drilled and/or slotted as required for any particular part to be raised and lowered by it.

Passing over the said pulley 9 is a belt 15, one end which is affixed to the bottom of the outer casing at 16, adjacent the lower nut 8, and the other end of which is affixed to the inner member 12, at a height thereon dependent on the desired maximum height of that member relatively to the outer casing. Thereby, as the intermediate member 7 is raised or lowered by the nut 8, it lifts and lowers the inner member 12 correspondingly, at twice the speed of itself. Instead of the belt 15 a cable or chain may be used, the flat pulley 9 in such cases being replaced by a grooved pulley or sprocket as the case may be.

One of the said side plates 5 of the outer casing is formed at its lower end with an opening 17 to provide a bearing mounting for a drive shaft 18, the inner end of such shaft being fitted within the casing with a bevel gear 19 to mesh with the aforesaid bevel gear 4 on the bottom end of the screw 3.

FIGS. 1 and 4 show how the three casings may nest within each other in a small compass, all the casings being of the same length. Rotation of the screw 2 in one direction extends the device downwardly as in FIGS. 2 and 5, whereas the opposite rotation of the screw extends the device upwardly as shown in FIGS. 3 and 6. In both cases a bearing 2 by obstructing the nut 8 constitutes a limit stop determining the maximum extension movement.

FIG. 8 illustrates an alternative arrangement where, instead of the said screw-and-nut thrust mechanism of FIGS. 1–7, a hydraulic or pneumatic system is provided. In this case a pressure cylinder 20 is housed in the said outer casing, for example by being supported at the top end by studs 21 entering into the side walls 5 of the casing, and the ram of such cylinder has a piston rod 22 extending out through the top of the cylinder. This ram 22 is connected by a suitable overhanging bracket 23 to the said intermediate member 7 which carries the pulley 9 or sprocket for the flexible extension member 15. As the ram is displaced upwards along the cylinder 20, the intermediate member 7 is lifted a corresponding distance and, by straightening out the flexible belt 15, lifts the inner member 10 through twice the distance in the same time.

In one adaptation of the particular mechanism so far described, with the outer casing applied say to the rear structure of a motor truck or lorry as in FIGS. 9 and 10, the intermediate and inner parts may be made to extend telescopically downwardly from the casing as shown in broken lines, so that the lower end of the inner part 10 is at ground level and, in the raised position, the intermediate and inner parts 7 and 10 may extend telescopically upwards out of the top of the casing. With a platform 24 attached to two such units, at the two sides of a vehicle, this platform may be moved to any position within the range of movement of the innermost members 10 of the units, say from ground level to the level of the deck of the vehicle, or even higher if stacking of goods in the vehicle is required.

In all cases the unit operates on a canti-lever system since the inner member 10 has the outwardly extending part 14 for attachment to the load or load-bearing member. Such part 14 may take many other forms besides that shown and need not extend the full length of the inner casing 10. The slide-ways between the telescoping parts have sufficient length in mutual contact to resist any relative tilting or twisting movement even in the fully-extended positions and as the extended machined slide surfaces are provided on all four sides of the telescoping members they resist tilting or twisting in all directions. Any suitable lubricating means will be provided for the mutually-engaging parts.

In applying the invention to the tail lift of a road vehicle, two of the said units will be provided as in FIGS. 9 and 10, one attached to each side wall of the vehicle body, and a common platform 24 will be connected to the outwardly-extending parts of the inner members. Instead of the units being permanently attached to the vehicle body they may be detachable so that, for example, when a load has been brought to the level of the deck of the vehicle the lifting gear may be moved along the vehicle towards the front, as indicated in FIG. 11, and the load thereon lifted still further so as to be at the level of a part 25 of the vehicle body over the driver's cab, on to which part the load may then be discharged. This dispenses with the need of a roller conveyor in a vehicle.

In the modification of the invention shown in FIGS. 12 and 13 the lifting device is rotatably mounted on a pillar 26 for rotation into and out of the vehicle as indicated by the full and dotted line positions. Alternatively, and as shown in FIG. 14, the load-carrying member 27, applied to the inner sliding member 10, is rotatable about the general axis of the lifting unit so that, for example, with the unit applied to the rear end of the vehicle, the load-carrying member may extend rearwardly from the vehicle for loading purposes as shown in full lines and, after having been lifted, may be rotated so as to lie within the vehicle as shown in broken lines.

In another example of the invention illustrated in FIG. 15, two of the units are used in front of a loading dock or bay 27, whilst in FIG. 16 two units are connected to a trolley or truck for movement about a factory floor or the like.

A further possible use of the invention is in connection with the overhead runway of a cable hoist or the like and this is illustrated diagrammatically in FIG. 17. In this adaptation the unit is arranged horizontally and is carried by runners 29 on an overhead gantry 30, the extension and contraction of the thrust mechanism being in a horizontal direction and moving the cable hoist 31 horizontally along the unit at right angles to the said gantry 30.

FIG. 18 illustrates one use of the unit as a hoist means from one floor level 32 to another 33.

According to another feature of the invention illustrated in FIGS. 19-21, the units are adapted for hinged connection to the rear of a vehicle so that, after they have lifted a load, for example, a container 34 of small articles the whole unit may be tipped over the rear edge 15 of the vehicle to discharge the contents of the load into the vehicle itself, the container 14 remaining held on the unit until re-lowered.

Figure 23:
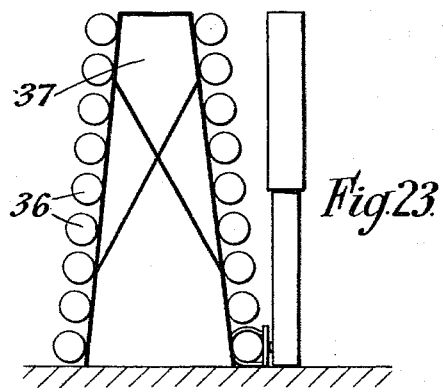
Figure 24:
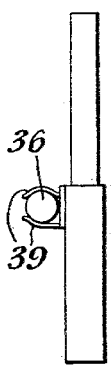
Figure 25:
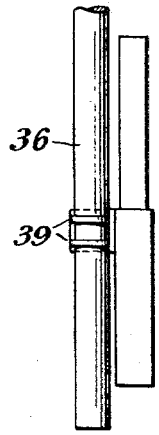
Figure 26:
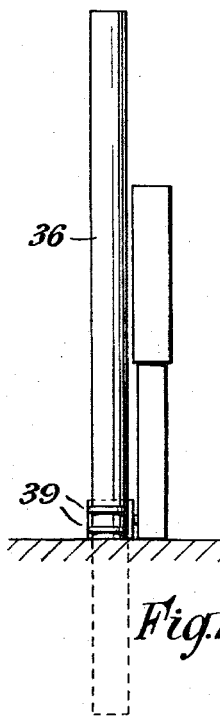

Still another adaptation of the invention, illustrated in FIGS. 22-26, is for the lifting of bar stock 36 and the like from a horizontal stack 37, for example tubes, rods and angle sections, and rotating the lifted element to 90° to present it vertically for dropping into a hole. For example, poles stacked horizontally in a mobile stand may be picked up one by one from the stand by the lifting unit, taken to the place of use, tipped up vertically, and dropped into a hole prepared for them. For this purpose the innermost member 10 of the telescopic unit carries a rotatable element 38, having jaws 39 to receive the stock.

In a still further use of the invention, see FIG. 27, two units 40 are applied to the side walls of a stairway 41 in an inclined position so as to lift a loading platform 42 up an inclined path above the stairway.

By providing suitably shaped adaptors 43, padded if necessary, one or more units may be applied to the outer skin of an aircraft fuselage, adapted for telescopic movement through a hatchway 44, as indicated in FIG. 28.

What I claim is:

1. A lifting device comprising a hollow outer member of substantially rectangular section, said hollow member being open at each end thereof and having a first longitudinally extending slot formed through one side thereof, limit stop means being disposed at each open end of said hollow outer member, a hollow intermediate member of substantially rectangular section within and approximately the same length as said outer member and having a second longitudinally extending slot formed through one side thereof, the said slots in said hollow outer member and said hollow intermediate member registering with one another, an inner member within the intermediate member and having a part projecting through said registering slots, projections running along substantially the entire length of the longitudinally extending outer edges of the intermediate member to provide bearing members therefor, said bearing members bearing against machined inner bearing surfaces formed on said outer member, projections running longitudinally along substantially the entire length of the longitudinally extending outer edges of the inner member to provide bearing members therefor, said last-mentioned bearing members bearing against machined inner bearing surfaces on the intermediate member, operating means connected between said intermediate member and one of the other two members so as to selectively move said intermediate member either above or below the said one member, guide means mounted on the upper end of said intermediate member, a flexible member looped over said guide means, the flexible member having the opposite ends thereof secured to said outer and inner members respectively in such a manner that the other of said other two members may be moved by said flexible member either above or below said intermediate member when said intermediate member is moved either above or below said one member.

2. Apparatus as defined in claim 1 wherein one end of said flexible member is secured to the lower end of the outer member and the other end of said flexible member is secured to a central portion of the inner member, said operating means being connected between the outer and intermediate members.

3. Apparatus as defined in claim 1 wherein said hollow outer member has a passage therethrough which is larger in cross section than said intermediate member, said operating means comprising a threaded rod extending within the passage in said hollow outer member and being rotatably mounted therein, means connected to said rod for rotating the same, a nut threaded on said rod and said nut being secured to a central portion of said intermediate member.

4. Apparatus as defined in claim 1 wherein said operating means comprises a fluid pressure operated piston within a cylinder and said guide means comprises a roller.

5. Apparatus as defined in claim 1 including a platform for supporting a load secured to the lower end of said inner member, pivot means on said outer member adapted to pivotally mount said device on support structure.

6. Apparatus as defined in claim 5 wherein said pivot means has a vertical axis.

7. Apparatus as defined in claim 1 including means secured to the lower end of said inner member for supporting a load, said means for supporting a load being pivoted about a horizontal axis for pivotal movement with respect to said inner member.

8. Apparatus as defined in claim 1 including a second separate lifting device of identical construction to the lifting device defined in claim 1, a common platform means for supporting a load, said common platform means being connected to the part of the inner members of said two lifting devices which project through the registering slots of the respective lifting devices whereby the common platform is supported between the two separate lifting devices to permit the platform to be raised and lowered by conjoint action of the two lifting devices, whereby the lifting devices may be supported on a portion of a vehicle for lifting and lowering loads with respect to the vehicle.

References Cited by the Examiner

UNITED STATES PATENTS

| 533,667 | 2/95 | Pokorny et al. | 187—11 |
|---|---|---|---|
| 1,096,656 | 5/14 | Whitney | 212—64 |
| 1,440,400 | 1/23 | Manierre | 212—55 |
| 2,553,156 | 5/51 | Woodward | 214—75 |
| 2,595,120 | 4/52 | Barnes | 187—9 |
| 2,626,065 | 1/53 | Sanders et al. | 214—16.14 |
| 2,632,530 | 3/53 | Wagner | 187—9 |
| 2,698,096 | 12/54 | Hughes | 212—55 |
| 2,741,379 | 4/56 | Stryker | 214—152 |
| 2,904,201 | 9/58 | Rhodes | 187—9 |
| 2,915,210 | 12/59 | Ehmann | 187—9 |
| 2,979,162 | 4/61 | Quayle | 187—9 |
| 3,011,664 | 12/61 | Novotney | 214—75 |

FOREIGN PATENTS

| 1,072,041 | 4/02 | France. |
|---|---|---|
| 1,108,626 | 1/56 | France. |

HUGO O. SCHULZ, *Primary Examiner.*
MORRIS TEMIN, *Examiner.*